United States Patent
Jokisch et al.

(10) Patent No.: US 9,279,030 B2
(45) Date of Patent: Mar. 8, 2016

(54) ISOCYANATE-CONTAINING FORMULATIONS

(75) Inventors: Carl Jokisch, Mannheim (DE); Horst Binder, Lampertheim (DE); Harald Schaefer, Mannheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 574 days.

(21) Appl. No.: 12/159,100

(22) PCT Filed: Jan. 4, 2007

(86) PCT No.: PCT/EP2007/050060
§ 371 (c)(1),
(2), (4) Date: Jun. 25, 2008

(87) PCT Pub. No.: WO2007/082789
PCT Pub. Date: Jul. 26, 2007

(65) Prior Publication Data
US 2009/0000516 A1    Jan. 1, 2009

(30) Foreign Application Priority Data
Jan. 13, 2006 (EP) .................................. 06100316

(51) Int. Cl.
*C08G 18/79* (2006.01)
*C08G 18/02* (2006.01)
*C08K 5/01* (2006.01)
*C09D 175/04* (2006.01)

(52) U.S. Cl.
CPC ............ *C08G 18/792* (2013.01); *C08G 18/022* (2013.01); *C08K 5/01* (2013.01); *C09D 175/04* (2013.01); *C08K 2201/014* (2013.01)

(58) Field of Classification Search
CPC ...... C08G 18/792; C08G 18/022; C08K 5/01; C08K 2201/014
USPC ........... 524/589, 590; 106/285; 525/452, 417; 252/182.2, 182.21, 182.22
See application file for complete search history.

(56) References Cited

U.S. PATENT DOCUMENTS

| | | | |
|---|---|---|---|
| 3,816,496 A | | 6/1974 | Schnabel |
| 3,987,075 A | * | 10/1976 | Schnabel ...................... 560/352 |
| 4,692,179 A | * | 9/1987 | Mehra ............................ 62/632 |
| 4,774,357 A | * | 9/1988 | Keggenhoff et al. ......... 560/352 |
| 5,216,042 A | * | 6/1993 | Daussin et al. ............... 521/160 |
| 5,578,420 A | * | 11/1996 | Takagi et al. ................. 430/306 |
| 6,051,674 A | * | 4/2000 | Yezrielev et al. .............. 528/45 |
| 6,242,530 B1 | * | 6/2001 | Konig et al. .................. 524/718 |
| 2003/0134127 A1 | * | 7/2003 | Konig et al. .................. 428/433 |
| 2003/0171488 A1 | * | 9/2003 | Konig et al. .................. 524/589 |

FOREIGN PATENT DOCUMENTS

| | | |
|---|---|---|
| DE | 100 22 036 | 11/2001 |
| EP | 1 371 636 | 12/2003 |
| WO | 01 60886 | 8/2001 |

OTHER PUBLICATIONS

Solvesso 100 MSDS. 2003.*
Bioremediation of trace organic compounds found in precious metals refineries' wastewaters. 2007.*
U.S. Appl. No. 12/593,295, filed Sep. 28, 2009, Schaefer, et al.

* cited by examiner

*Primary Examiner* — Michael L Leonard
(74) *Attorney, Agent, or Firm* — Oblon, McClelland, Maier & Neustadt, L.L.P.

(57) ABSTRACT

Low-viscosity preparations of isocyanate compounds in solvents, and their use.

20 Claims, No Drawings

ISOCYANATE-CONTAINING FORMULATIONS

The present invention relates to low-viscosity preparations of isocyanate compounds in solvents, and to their use.

Preparations of polyisocyanates, isocyanurates for example, are already well established and are available in the form of numerous commercial products from a variety of manufacturers.

Since polyisocyanates frequently have a high viscosity or are even solid at room temperature, it is common to add a solvent to polyisocyanate preparations of this kind. Widespread solvents include butyl acetate, ethyl acetate, methoxypropyl acetate, toluene, xylene, fluorinated aromatics, aliphatic and aromatic hydrocarbon mixtures, and also mixtures thereof. The latter are sold for example under the trade names Solvesso® from ExxonMobil, Hydrosol® from Kemethyl or Shellsol® from Shell, or under the designations solvent naphtha, Kristaloel, white spirit, heavy benzine, etc., in different and varying compositions.

The purpose of blending polyisocyanates with solvents is to dissolve high-viscosity or solid polyisocyanates and to provide polyisocyanate preparations in as low-viscosity a form as possible. The purpose of this is, for example, to improve miscibility and processibility, especially of solid polyisocyanates and those of relatively high viscosity, but also to enhance the surface quality of coatings.

It was an object of the present invention to provide polyisocyanate preparations which have a particularly low viscosity.

This object has been achieved by means of mixtures comprising
- (A) at least one optionally blocked diisocyanate and/or polyisocyanate,
- (B) at least one aromatic hydrocarbon mixture predominantly composed of alkyl-substituted aromatic compounds having 9 and 10 carbon atoms, and
- (C) if appropriate at least one further solvent other than (B), wherein the fraction of alkyl-substituted aromatic compounds having 10 carbon atoms in the aromatic hydrocarbon mixture (B) is not more than 35% by weight.

It has been found that such mixtures exhibit a significantly lower viscosity than mixtures containing the same amount of (A) and a higher fraction of alkyl-substituted aromatic compounds having 10 carbon atoms.

The different commercially customary aromatic hydrocarbon mixtures in each case have only a low viscosity of less than 1 mPas. A different fraction of alkyl-substituted aromatic compounds having 9 and 10 carbon atoms has virtually no noticeable effect on the viscosity of the pure hydrocarbon mixtures. All the more surprising is the observation that the fraction of alkyl-substituted aromatic compounds having 9 and 10 carbon atoms has a pronounced effect on the viscosity of polyisocyanate preparations.

The mixtures of the invention comprising at least one optionally blocked diisocyanate and/or polyisocyanate (A).

The compounds in question may be monomers or oligomers of aromatic, aliphatic or cycloaliphatic diisocyanates.

The NCO functionality of such a compound is generally at least 1.8 and can be up to 8, preferably 1.8 to 5, and more preferably 2 to 4.

Suitable polyisocyanates include, in particular, polyisocyanates containing isocyanurate groups, polyisocyanates containing uretdione groups, polyisocyanates containing biuret groups, polyisocyanates containing urethane groups or allophanate groups, polyisocyanates comprising oxadiazinetrione groups or iminooxadiazinedione groups, uretonimine-modified polyisocyanates, synthesized in each case from linear or branched $C_4$-$C_{20}$ alkylene diisocyanates, cycloaliphatic diisocyanates having a total of 6 to 20 carbon atoms or aromatic diisocyanates having a total of 8 to 20 carbon atoms, or mixtures thereof.

The diisocyanates are preferably isocyanates having 4 to 20 carbon atoms. Examples of typical diisocyanates are aliphatic diisocyanates such as tetramethylene diisocyanate, hexamethylene diisocyanate (1,6-diisocyanatohexane), octamethylene diisocyanate, decamethylene diisocyanate, dodecamethylene diisocyanate, tetradecamethylene diisocyanate, derivatives of lysine diisocyanate, trimethylhexane diisocyanate or tetramethylhexane diisocyanate, cycloaliphatic diisocyanates such as 1,4-, 1,3- or 1,2-diisocyanatocyclohexane, 4,4'- or 2,4'-di(isocyanatocyclohexyl)-methane or mixtures thereof, 1-isocyanato-3,3,5-trimethyl-5-(isocyanatomethyl)-cyclohexane (isophorone diisocyanate), 1,3- or 1,4-bis(isocyanatomethyl)cyclohexane or 2,4-, or 2,6-diisocyanato-1-methylcyclohexane, and also 3 (or 4), 8 (or 9)-bis-(isocyanatomethyl)tricyclo[$5.2.1.0^{2,6}$]decane isomer mixtures, and also aromatic diisocyanates such as tolylene 2,4- or 2,6-diisocyanate and the isomer mixtures thereof, m- or p-xylylene diisocyanate, 2,4'- or 4,4'-diisocyanatodiphenylmethane and the isomer mixtures thereof, phenylene 1,3- or 1,4-diisocyanate, 1-chlorophenylene 2,4-diisocyanate, naphthylene 1,5-diisocyanate, diphenylene 4,4'-diisocyanate, 4,4'-diisocyanato-3,3'-dimethylbiphenyl, 3-methyldiphenylmethane 4,4'-diisocyanate, tetramethylxylylene diisocyanate, 1,4-diisocyanatobenzene or diphenyl ether 4,4'-diisocyanate.

Mixtures of said diisocyanates may also be present.

Also suitable are higher isocyanates, having on average more than 2 isocyanate groups. Examples include triisocyanates such as triisocyanatononane, 2,4,6-triisocyanatotoluene, triphenylmethane triisocyanate or 2,4,4'-triisocyanatodiphenyl ether, or the mixtures of diisocyanates, triisocyanates, and higher polyisocyanates for example that are obtained by phosgenating corresponding aniline/formaldehyde condensates and represent polyphenyl polyisocyanates containing methylene bridges.

The di- and polyisocyanates which can be used preferably have an isocyanate group (calculated as NCO, molecular weight=42) content of 10% to 60% by weight, based on the di- and polyisocyanate (mixture), preferably 15% to 60% by weight, and more preferably 20% to 55% by weight.

Preference is given to aliphatic and/or cycloaliphatic di- and polyisocyanates, qualified collectively as (cyclo)aliphatic for the purposes of this specification, examples being the aliphatic and/or cycloaliphatic diisocyanates stated above, or mixtures thereof.

Particular preference is given to hexamethylene diisocyanate, 1,3-bis(isocyanatomethyl)cyclohexane, isophorone diisocyanate, and 4,4'- or 2,4'-di(isocyanatocyclohexyl) methane, very particular preference to isophorone diisocyanate and hexamethylene diisocyanate, and especial preference to isophorone diisocyanate (IPDI).

IPDI is usually in the form of a mixture, specifically a mixture of the cis and trans isomers, generally in a proportion of between 60:40 and 80:20 (w/w), preferably in a proportion of between 70:30 and 75:25, and more preferably in a proportion of approximately 75:25.

Dicyclohexylmethane 4,4'-diisocyanate may likewise be in the form of a mixture of the different cis and trans isomers.

Aromatic isocyanates are those which comprise at least one aromatic ring system.

Cycloaliphatic isocyanates are those which comprise at least one cycloaliphatic ring system.

Aliphatic isocyanates are those which comprise exclusively linear or branched chains, in other words acyclic compounds.

For the present invention it is possible to use not only those di- and polyisocyanates obtained by phosgenating the corresponding amines but also those prepared without the use of phosgene, i.e., by phosgene-free processes. According to EP-A-0 126 299 (U.S. Pat. No. 4,596,678), EP-A-126 300 (U.S. Pat. No. 4,596,679), and EP-A-355 443 (U.S. Pat. No. 5,087, 739), for example, (cyclo)aliphatic diisocyanates, such as hexamethylene 1,6-diisocyanate (HDI), isomeric aliphatic diisocyanates having 6 carbon atoms in the alkylene radical, 4,4'- or 2,4'-di(isocyanatocyclohexyl)methane, and 1-isocyanato-3-isocyanatomethyl-3,5,5-trimethyl-cyclohexane (isophorone diisocyanate or IPDI), for example, can be prepared by reacting the (cyclo)aliphatic diamines with, for example, urea and alcohols to give (cyclo)aliphatic biscarbamic esters and subjecting said esters to thermal cleavage into the corresponding diisocyanates and alcohols. The synthesis takes place usually continuously in a circulation process and in the presence, if appropriate, of N-unsubstituted carbamic esters, dialkyl carbonates, and other byproducts recycled from the reaction process. Di- or polyisocyanates obtained in this way generally contain a very low or even unmeasurable fraction of chlorinated compounds, leading to favorable color numbers in the products.

In one embodiment of the present invention the di- and polyisocyanates (A) have a total hydrolyzable chlorine content of less than 200 ppm, preferably of less than 120 ppm, more preferably less than 80 ppm, very preferably less than 50 ppm, in particular less than 15 ppm, and especially less than 10 ppm. This can be measured by means, for example, of ASTM specification D4663-98. Alternatively, though, di- and polyisocyanates having a higher chlorine content can also be used.

Mention may further be made of
1) Polyisocyanates containing isocyanurate groups and derived from aromatic, aliphatic and/or cycloaliphatic diisocyanates. Particular preference is given in this context to the corresponding aliphatic and/or cycloaliphatic isocyanatoisocyanurates and in particular to those based on hexamethylene diisocyanate and isophorone diisocyanate. The isocyanurates present are, in particular, tris-isocyanatoalkyl and/or tris-isocyanatocycloalkyl isocyanurates, which constitute cyclic trimers of the diisocyanates, or are mixtures with their higher homologues containing more than one isocyanurate ring. The isocyanatoisocyanurates generally have an NCO content of 10% to 30% by weight, in particular 15% to 25% by weight, and an average NCO functionality of 2.6 to 8. Suitable isocyanurates include those prepared from a mixture of different diisocyanates, such as from HDI and IPDI, for example, or from a mixture of (cyclo)aliphatic and aromatic diisocyanates.
2) Uretdione diisocyanates with aromatically, aliphatically and/or cycloaliphatically attached isocyanate groups, preferably aliphatically and/or cycloaliphatically attached, and in particular those derived from hexamethylene diisocyanate or isophorone diisocyanate. Uretdione diisocyanates are cyclic dimerization products of diisocyanates.
   The uretdione diisocyanates can be used in the preparations as a sole component or in a mixture of other polyisocyanates, particularly those specified under 1).
3) Polyisocyanates containing biuret groups and having aromatically, cycloaliphatically or aliphatically attached, preferably cycloaliphatically or aliphatically attached, isocyanate groups, especially tris(6-isocyanatohexyl)biuret or its mixtures with its higher homologues. These polyisocyanates containing biuret groups generally have an NCO content of 18% to 22% by weight and an average NCO functionality of 2.8 to 8, in particular of 2.8 to 4.5.
4) Polyisocyanates containing urethane and/or allophanate groups and having aromatically, aliphatically or cycloaliphatically attached, preferably aliphatically or cycloaliphatically attached, isocyanate groups, such as may be obtained, for example, by reacting excess amounts of hexamethylene diisocyanate or of isophorone diisocyanate with mono- or polyhydric alcohols such as, for example, methanol, ethanol, isopropanol, n-propanol, n-butanol, isobutanol, sec-butanol, tert-butanol, n-hexanol, n-heptanol, n-octanol, n-decanol, n-dodecanol (lauryl alcohol), 2-ethylhexanol, n-pentanol, stearyl alcohol, cetyl alcohol, lauryl alcohol, ethylene glycol monomethyl ether, ethylene glycol monoethyl ether, 1,3-propanediol monomethyl ether, cyclopentanol, cyclohexanol, cyclooctanol, cyclododecanol, trimethylolpropane, neopentyl glycol, pentaerythritol, 1,4-butanediol, 1,6-hexanediol, 1,3-propanediol, 2-ethyl-1,3-propanediol, 2-methyl-1,3-propanediol, ethylene glycol, diethylene glycol, triethylene glycol, tetraethylene glycol, pentaethylene glycol, glycerol, 1,2-dihydroxypropane, 2,2-dimethyl-1,2-ethanediol, 1,2-butanediol, 1,4-butanediol, 3-methylpentane-1,5-diol, 2-ethylhexane-1,3-diol, 2,4-diethyloctane-1,3-diol, hydroxypivalic acid neopentyl glycol ester, ditrimethylolpropane, dipentaerythritol, 2,2-bis(4-hydroxycyclohexyl)propane, 1,1-, 1,2-, 1,3-, and 1,4-cyclohexanedimethanol, 1,2-, 1,3- or 1,4-cyclohexanediol or mixtures thereof. These polyisocyanates containing urethane and/or allophanate groups generally have an NCO content of 12% to 20% by weight and an average NCO functionality of 2.5 to 4.5.
5) Polyisocyanates comprising oxadiazinetrione groups, derived preferably from hexamethylene diisocyanate or isophorone diisocyanate. Polyisocyanates of this kind comprising oxadiazinetrione groups are accessible from diisocyanate and carbon dioxide.
6) Polyisocyanates comprising iminooxadiazinedione groups, derived preferably from hexamethylene diisocyanate or isophorone diisocyanate. Polyisocyanates of this kind comprising iminooxadiazinedione groups are preparable from diisocyanates by means of specific catalysts.
7) Uretonimine-modified polyisocyanates.
8) Carbodiimide-modified polyisocyanates.
9) Hyperbranched polyisocyanates, of the kind known for example from DE-A1 10013186 or DE-A1 10013187.
10) Polyurethane-polyisocyanate prepolymers, from di- and/or polyisocyanates with alcohols.
11) Polyurea-polyisocyanate prepolymers.
12) Polyisocyanates comprising more than one of the functionalities specified under 1-11, of the kind described for example in EP 1446435.

Polyisocyanates 1) to 12) may be used in a mixture, including if appropriate in a mixture with diisocyanates.

Preferred compounds (A) are the urethanes, biurets, and isocyanurates, more preferably the isocyanurates, of hexamethylene 1,6-diisocyanate (HDI) or 1-isocyanato-3-isocyanatomethyl-3,5,5-trimethylcyclohexane, very preferably of 1-isocyanato-3-isocyanatomethyl-3,5,5-trimethylcyclohexane. Preference is also given to other polyisocyanates, of higher viscosity or solid, of the kind formed, for example, in the reaction of diisocyanates/polyisocyanates to products of higher functionality or in the case where other, higher-viscosity monomers are used.

For use in the mixtures of the invention the invention prefers those diisocyanates and polyisocyanates which in solvent-free form have a viscosity at 23° C. of at least 8000 mPas, more preferably at least 12 000 mPas, very preferably at least 20 000 mPas, in particular at least 50 000 mPas, and especially at least 100 000 mPas. Particular advantage is given to using diisocyanates and polyisocyanates which are solid at 23° C.

Preference is alternatively given, for use in the mixtures of the invention, to those polyisocyanates which have a functionality of at least 4.

As a result of their preparation it is possible for polyisocyanates (A) still to have a small fraction of their parent monomeric diisocyanate; for example, up to 5%, more preferably up to 3%, very preferably up to 2%, in particular up to 1%, especially up to 0.5%, and even up to 0.25% by weight.

The type of oligomerization will be illustrated here using the example of isocyanurate formation. The oligomerization procedure plays no substantial part in general as regards the isocyanate component (A). Nevertheless, the extent of oligomerization may constitute an important parameter for the product obtained as isocyanate component (A), since products with a higher degree of oligomerization usually also have a higher viscosity (see below).

For isocyanurate formation it is possible with preference to employ the following catalysts:

Tetraalkylammonium carboxylates and trialkylbenzylammonium carboxylates.

Quaternary ammonium hydroxides, preferably N,N,N-trimethyl-N-benzylammonium hydroxide and N,N,N-trimethyl-N-(2-hydroxypropyl)ammonium hydroxide, in accordance with DE-A-38 06 276.

Hydroxyalkyl-substituted quaternary ammonium hydroxides in accordance with EP-A-0 010 589 (U.S. Pat. No. 4,324, 879).

Organic metal salts of the formula $(A)_n\text{-R—O—CO—O}^{\ominus} M^{\oplus}$ in accordance with U.S. Pat. No. 3,817,939, in which A is a hydroxyl group or a hydrogen atom, n is a number from 1 to 3, R is a polyfunctional linear or branched, aliphatic or aromatic hydrocarbon radical, and M is a cation of a strong base, such as an alkali metal cation or a quaternary ammonium cation, such as tetraalkylammonium, for example.

Quaternary hydroxyalkylammonium compounds of the formula

as catalyst in accordance with DE-A-26 31 733 (U.S. Pat. No. 4,040,992).

Preference is further given to quaternary ammonium carboxylates and/or ammonium hydroxylates of the general formula

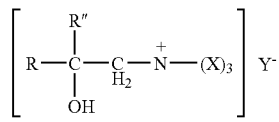

where $Y^- = R'COO^-$ or $OH^-$ as catalyst, in which X independently at each occurrence represents identical or different (cyclo)aliphatic, araliphatic or heterocyclic hydrocarbon radicals, it being possible for two radicals X with the quaternary nitrogen atom to form a ring comprising, if appropriate, one or more heteroatoms, or for three radicals X, via a common heteroatom, to form a bicyclic ring with the quaternary nitrogen, and R, R' and R" independently of one another being hydrogen or a radical from the group of alkyl, cycloalkyl or aralkyl having 1-12 carbon atoms.

The ammonium ions in this case may also be part of a ring system having one or more members, derived for example from piperazine, morpholine, piperidine, pyrrolidine or diazabicyclo[2.2.2]octane.

Particular preference is given to trimerization catalysts of the kind known from DE 10 2004 012571 A1 and also from EP-A1 668 271, particularly therein from page 4 line 16 to page 6 line 47.

Very particular preference is given to N-(2-hydroxypropyl)-N,N,N-trimethylammonium 2-ethylhexanoate (DABCO TMR®) and N-(2-hydroxypropyl)-N,N,N-trimethylammonium 2-formate (DABCO TMR®-2) from Air Products.

For the purpose of improved handling it is possible for the catalyst to be dissolved or dispersed in a solvent. Examples of those suitable for this purpose include 1 to 8 carbon alcohols, diols, ketones, ethers, and esters, and also mixtures thereof.

Use is made for example of the aforementioned catalysts DABCO TMR® and DABCO TMR®-2 in the preferred form of an approximately 75% strength by weight solution in ethylene glycol or propylene glycol.

The catalysts set out above are used typically in an amount below 0.1% by weight, based on the weight of the isocyanate, preferably below 0.05%, more preferably below 0.02%, very preferably below 0.015%, and especially below 0.01% by weight, if appropriate in solution or dispersion in a solvent (mixture), as indicated above.

Depending on the type of catalyst used, the catalyst is typically employed in amounts of at least 10 ppm by weight, preferably at least 20, more preferably at least 30, very preferably at least 50, and in particular at least 70 ppm by weight.

The oligomerization may be, for example, a conversion to polyisocyanates containing isocyanurate, allophanate, biuret, uretdione, oxadiazinetrione, iminooxadiazinetrione and/or urethane groups, preferably to polyisocyanates containing isocyanurate, allophanate, uretdione and/or urethane groups, and more preferably to polyisocyanates containing isocyanurate groups. In this context it is possible that catalysts other than those specified above may be more suitable; these catalysts are known per se to the skilled worker.

The trimerization to polyisocyanates containing isocyanurate groups can be carried out in general within a total residence time of 1-120 minutes under typical reaction conditions, preferably continuously. Compounds are obtained which have one or else two or more isocyanurate rings. Compounds of this kind are described in the literature.

In one preferred embodiment of the present invention the trimerization of the isocyanate is carried out partially, so that only a low proportion of higher isocyanurates—that is, those having two or more isocyanurate rings—is formed. Higher isocyanurates lead to an increase in the viscosity of the product and to a loss of isocyanate groups.

Thus, for example, in the case of HDI, the reaction is carried out to a conversion of not more than 45%, preferably up to 40%, more preferably up to 35%, and very preferably up to 30%. In order not to have excessive recycle streams, the conversion ought to amount to at least 10%, preferably at least 15%, more preferably at least 20%, and very preferably at least 25%.

The conversion is generally steered in such a way that the product, in each case following removal of unreacted diisocyanate, has an average NCO functionality of below 8, preferably below 3.8, and more preferably below 3.7. However, it may also be sensible to obtain products having a higher functionality.

Depending on the catalyst used and on the process, it is possible for a certain fraction of uretdione to be formed in part. Said fraction is generally below 5% by weight, preferably below 3%, more preferably below 2%, and very preferably below 1% by weight.

The reaction can be stopped thermally or by adding a deactivator.

Examples of suitable deactivators include inorganic acids, such as hydrogen chloride, phosphorous acid or phosphoric acid, carbonyl halides, such as acetal chloride or benzoyl chloride, sulfonic acids or sulfonic esters, such as methanesulfonic acid, p-toluenesulfonic acid, or methyl or ethyl p-toluenesulfonate, m-chloroperbenzoic acid, and, preferably, dialkyl phosphates such as dibutyl phosphate and di-2-ethylhexyl phosphate, for example.

Relative to the amount of active trimerization catalyst in the reaction mixture, the deactivators can be used in equivalent or excess amounts, preference being given—for reasons not least of economics—to the smallest active amount, which can easily be determined experimentally. For example, the deactivator is used in a ratio to the active trimerization catalyst of 1-2.5:1 mol/mol, preferably 1-2:1, more preferably 1-1.5:1, and very preferably 1-1.2:1 mol/mol. If the amount of active catalyst in the reaction mixture is unknown then it is possible, based on the initial amount of catalyst employed, to use 0.3-1.2 mol of deactivator per mole of catalyst employed, preferably 0.4 to 1.0 mol/mol, more preferably 0.5 to 0.8 mol/mol.

The addition is dependent on the nature of the deactivator. Hydrogen chloride, for instance, is passed preferably in gaseous form over or, preferably, through the reaction mixture; liquid deactivators are added usually as they are or as a solution in a solvent which is inert under the reaction conditions; and solid deactivators are added as they are or as a solution or suspension in a solvent that is inert under the reaction conditions.

The deactivator can be added at the reaction temperature or alternatively at a lower temperature.

Deactivation can take place thermally preferably when using a trimerization catalyst containing a 2-hydroxyalkylammonium group. The thermal deactivation of thermolabile catalysts of this kind takes place at temperatures above 80° C., preferably above 100° C., more preferably above 120° C., and very preferably above 130° C., and this can be exploited for the purpose of their deactivation.

Deactivation in this way can take place for example in a section of the reactor that has the appropriate temperature; through a heat exchanger inserted between reactor and distillation and operated at the relevant temperature; or in the distillation, if the latter is operated at a corresponding wall temperature.

It is of course also possible to stop the reaction by cooling: for example, by cooling to a temperature below 60° C., preferably to below 55° C., more preferably to below 50° C., very preferably to below 45° C., and in particular to below 40° C.

Cooling of this kind may take place for example in a section of the reactor that has the corresponding temperature, or through a heat exchanger which is inserted between reactor and distillation and is operated at the relevant temperature.

As a result of simple cooling, however, the catalyst remains in the reaction mixture and hence continues to remain active, so that the reaction is not ended in the true sense but instead can be resumed at any time on heating to a temperature above about 50° C.

It is therefore preferred to stop the reaction by thermal deactivation of the catalyst or by means of a deactivator.

Stirring the conversion also in general allows influence to be exerted over the properties of the product. At low conversions the product is generally close to an ideal trimer. The higher the set conversion, the greater, in general as a result of follow-on reactions, becomes the proportion of tetramers, pentamers, hexamers, etc.

The higher the level of higher oligomers, the higher too, in most cases, is the viscosity of the products.

The amount of the individual oligomers can be determined by means of gel permeation chromatography (GPC) in tetrahydrofuran (THF) against polystyrene as standard.

In general the destination trimer content is from 40% to 80% by weight, preferably 50% to 75%, more preferably 55% to 75%, and very preferably 55% to 70% by weight.

Particularly suitable for the mixtures of the invention are compounds which contain isocyanurate groups, are based on hexamethylene diisocyanate, and have an NCO content to DIN EN ISO 11909 of 21.5%-22.5%, a viscosity (solvent-free) at 23° C. to DIN EN ISO 3219/A.3 of 1000-4000 mPas, preferably 2000-4000 mPas, and more preferably 2500-4000 mPas and/or an average NCO functionality of 3.0 to 4.0, preferably 3.0 to 3.7, more preferably 3.1 to 3.5. In order that coating compositions based on the reaction products of isocyanurate group-containing compounds of this kind subsequently possess high suitability for clearcoat materials, it is further advantageous for the isocyanurate group-containing compounds to have a HAZEN/APHA color number to DIN EN 1557 of not more than 40.

Additionally suitable for the mixtures of the invention are compounds which contain biuret groups, are based on hexamethylene diisocyanate, and have an NCO content to DIN EN ISO 11909 of 22%-24%, a viscosity (solvent-free) at 23° C. to DIN EN ISO 3219/A.3 of 1500-20 000 mPas, preferably less than 10 000 mPas, and more preferably less than 6500 mPas, and/or an average NCO functionality of 3.0 to 8, preferably 3.0 to 3.7, more preferably 3.1 to 3.5. In order that coating compositions based on the reaction products of biuret group-containing compounds of this kind subsequently possess high suitability for clearcoat materials, it is further advantageous for the biuret group-containing compounds to have a HAZEN/APHA color number to DIN EN 1557 of not more than 40.

Especially suitable for the mixtures of the invention are compounds which contain isocyanurate groups, are based on isophorone diisocyanate, and have an NCO content to DIN EN ISO 11909 of 16.7%-17.6%, a melting range of 100 to 130° C. and/or an average NCO functionality of 3.0 to 4.0, preferably 3.0 to 3.7, more preferably 3.1 to 3.5.

The diisocyanates or polyisocyanates set out above may also be present at least partly in blocked form.

Classes of compound employed for blocking are described in D. A. Wicks, Z. W. Wicks, Progress in Organic Coatings, 36, 148-172 (1999), 41, 1-83 (2001), and 43, 131-140 (2001).

Examples of classes of compound used for blocking are phenols, imidazoles, triazoles, pyrazoles, oximes, N-hydroxyimides, hydroxybenzoic esters, secondary amines, lactams, CH-acidic cyclic ketones, malonic esters or alkyl acetoacetates.

Imidazolic groups as groups reactive toward isocyanate groups, for the purpose of blocking, referred to here for short as "imidazoles", are known for example from WO 97/12924 and EP 159117, triazoles from U.S. Pat. No. 4,482,721; CH-acidic cyclic ketones are described for example in DE-A1 102 60 269, particularly in paragraph [0008] and preferably paragraphs [0033] to [0037] therein, with particular preference cyclopentanone-2-carboxylic esters, and especially cyclopentanone-2-carboxylic acid ethyl ester.

Examples of preferred imidazoles are those imidazoles which as well as the free NH group also comprise a further functional group, such as —OH, —SH, —NH—R, —NH2, —CHO, such as, for example, 4-(hydroxymethyl)imidazole, 2-mercaptoimidazole, 2-aminoimidazole, 1-(3-aminopropyl)imidazole, 4,5-diphenyl-2-imidazolethiol, histamine, 2-imidazolecarboxaldehyde, 4-imidazolecarboxylic acid, 4,5-imidazoledicarboxylic acid, L-histidine, L-carnosine, and 2,2'-bis(4,5 dimethylimidazole).

Suitable triazoles are 3-amino-1,2,4-triazole, 4-amino-1,2,4-triazole, 3,5-diamino-1,2,4-triazole, 1H-1,2,4-triazole-3-thiol, 5-methyl-1H-1,2,4-triazole-3-thiol, and 3-amino-5-mercapto-1,2,4-triazole.

Secondary amines are, in particular, tert-butylbenzylamine.

Preference is given to phenols, oximes, N-hydroxyimides, lactams, imidazoles, triazoles, malonic esters, and alkylacetonates, particular preference to lactams, phenols, imidazoles, triazoles, and malonic esters, and very particular preference to phenols.

The amount of the isocyanate component (A) in the mixture of the invention can be in general up to 98% by weight, based on the sum of polyisocyanate and solvent, preferably up to 95%, more preferably up to 90%, very preferably up to 86%, and in particular up to 80% by weight.

The amount of the isocyanate component (A) in the mixture of the invention is in general 50% by weight or more, based on the sum of polyisocyanate and solvent, preferably 60% by weight or more, more preferably 63% by weight or more, and very preferably 65% by weight or more.

Solvent used for the isocyanate preparations of the invention is at least one aromatic hydrocarbon mixture (B) composed predominantly of alkyl-substituted aromatic compounds having 9 and 10 carbon atoms.

Predominantly in this context means an amount of more than 50% by weight, preferably at least 60%, more preferably at least 70%, very preferably at least 85%, in particular at least 80%, especially at least 85%, often at least 90%, and even at least 95% by weight.

Technical hydrocarbon mixtures employed as solvents comprise mostly aliphatics, cycloaliphatics, monocyclic aromatics, and dicyclic or polycyclic aromatics, and also mixtures thereof.

Aliphatics in this context are acyclic saturated hydrocarbons, mostly linear or branched alkanes.

Cycloaliphatics in this context are cyclic saturated hydrocarbons, mostly cycloalkanes optionally substituted by one or more alkyl groups.

In the hydrocarbon mixtures (B) the fraction of aliphatics and/or cycloaliphatics is generally less than 30% by weight, preferably less than 25%, more preferably less than 15%, very preferably less than 10%, in particular less than 5%, especially less than 2.5%, and indeed less than 1% by weight.

Dicyclic and polycyclic aromatics are naphthalenes and higher polycondensed aromatics, such as anthracenes, phenanthrenes, etc., that are unsubstituted or substituted by one or more alkyl groups.

In the hydrocarbon mixtures (B) the fraction of naphthalenes and higher polycondensed aromatics is generally less than 5% by weight, preferably less than 3%, more preferably less than 2%, very preferably less than 1%, in particular less than 0.5%, especially less than 0.25%, and indeed less than 0.1% by weight.

Distinguished from these are the monocyclic aromatics. These comprise the entirety of the benzene rings optionally substituted by one or more alkyl groups.

The monocyclic aromatics are differentiated according to the total number of their constituent carbon atoms.

In the hydrocarbon mixtures (B) the fraction of monocyclic aromatics having up to 8 carbon atoms is generally less than 5% by weight, preferably less than 4%, more preferably less than 3%, very preferably less than 2%, in particular less than 1%, and especially less than 0.5% by weight.

In the hydrocarbon mixtures (B) the explicit fraction of benzene is generally less than 5% by weight, preferably less than 3%, more preferably less than 1%, very preferably less than 0.5%, in particular less than 0.25%, especially less than 0.2%, and indeed less than 0.1% by weight.

In the hydrocarbon mixtures (B) the fraction of the aromatics having at least 11 carbon atoms is generally less than 5% by weight, preferably less than 4%, more preferably less than 3%, very preferably less than 2%, in particular less than 1%, and especially less than 0.5% by weight.

In accordance with the invention the fraction of alkyl-substituted aromatic compounds having 10 carbon atoms in the aromatic hydrocarbon mixture (B) is not more than 35% by weight, preferably not more than 25%, more preferably not more than 20%, very preferably not more than 15%, especially not more than 12%, in particular not more than 8%, and specifically not more than 5% by weight.

Aromatics having up to 8 carbon atoms are, for example, benzene, toluene, o-, m-, and p-xylene, and ethylbenzene.

Aromatics having 9 carbon atoms are, for example, 1,2,3-, 1,2,4-, and 1,3,5-trimethylbenzene, 1,2-, 1,3-, and 1,4-ethylmethylbenzene, n-propylbenzene, and isopropylbenzene.

Aromatics having 10 carbon atoms are, for example, 1,2,3,4-, 1,2,3,5-, and 1,2,4,5-tetramethylbenzene, 1,2-, 1,3-, and 1,4-diethylbenzene, 1,2,3-, 1,2,4-, and 1,3,5-ethyldimethylbenzene isomers, 1,2-, 1,3-, and 1,4-methyl-n-propylbenzene, 1,2-, 1,3-, and 1,4-methylisopropylbenzene, n-butylbenzene, isobutylbenzene, sec-butylbenzene, tert-butylbenzene, 4- or 5-methylindane, and tetralin.

The boiling range of the hydrocarbon mixtures (B) may comprise the temperature range from approximately 150° C. to 190° C., preferably 150 to 185° C., more preferably 150 to 180° C., and very preferably from 154 to 178° C.

In the hydrocarbon mixtures (B) the fraction of compounds containing at least one heteroatom is generally less than 3% by weight, preferably less than 2%, more preferably less than 1%, very preferably less than 0.5%, in particular less than 0.25%, and especially less than 0.1% by weight. Examples thereof include thiophenes, furans, pyrroles and pyridines.

In the hydrocarbon mixtures (B) the sulfur content, calculated as S with the molar mass 32 g/mol, is generally less than 5000 ppm, preferably less than 2000, more preferably less than 1000, very preferably less than 500, and in particular less than 250 ppm.

The fraction of olefinically unsaturated compounds in the hydrocarbon mixtures (B) is generally less than 3% by weight, preferably less than 2%, more preferably less than 1%, and very preferably less than 0.5% by weight. Examples thereof are alkenes, cycloalkenes, and styrene and its alkyl-substituted derivatives.

A further, optional constituent of the mixtures of the invention is at least one further solvent other than (B). The solvents involved, therefore, are nonhydrocarbons.

The solvents are preferably selected from the group consisting of halogenated hydrocarbons, ketones, esters, and ethers. Particular preference is given to esters and, among them, to alkyl alkanoates and alkoxylated alkyl alkanoates.

Halogenated hydrocarbons are, for example, chlorobenzene and dichlorobenzene or its isomer mixtures.

Ethers are, for example, THF, dioxane, and also the dimethyl, diethyl or di-n-butyl ethers of ethylene glycol, diethylene glycol, diethylene glycol, triethylene glycol, propylene glycol, dipropylene glycol or tripropylene glycol.

Ketones are, for example, acetone, ethyl methyl ketone, diethyl ketone, isobutyl methyl ketone, cyclohexanone or cyclopentanone.

Esters are, for example, n-butyl acetate, ethyl acetate, 1-methoxy-2-propyl acetate, and 2-methoxyethyl acetate.

Such mixtures of (B) with (C) can be present in the volume ratio of 5:1 to 1:5, preferably in a volume ratio of 4:1 to 1:4, more preferably in a volume ratio of 3:1 to 1:3, very preferably in a volume ratio of 2:1 to 1:2, and in particular in a volume ratio of 1.5:1 to 1:1.5.

If a solvent (C) is present then preference is given to inventive mixtures of (B) with n-butyl acetate or of (B) with 1-methoxy-2-propyl acetate.

The mixtures of the invention are generally prepared by simply mixing the isocyanate component (A) with the solvent (B) and, if appropriate, (C). Particularly in the case of viscous or solid isocyanate components (A), simple mixing may present difficulties, since the commixing of the two phases may in that case be hindered.

In one preferred embodiment, therefore, isocyanate component (A) and solvent (B) and also, if appropriate, (C) are mixed with one another at a temperature of at least 40° C. under a pressure above atmospheric pressure.

The temperature in this case can amount to preferably at least 45° C., more preferably at least 50° C., very preferably at least 55° C., in particular at least 60° C., and especially at least 70° C.

The stated temperature refers to at least one of the solvent (A) components to be mixed, preferably at least to the isocyanate component (A), and more preferably to both.

The temperature of the mixture during the mixing operation ought normally to be at least 10° C. below the boiling temperature or below the lower limit of the boiling range, in accordance with ASTM D850, of the solvent or solvent mixture used, under the applied pressure, preferably at least 20° C., and more preferably at least 40° C.

The pressure under which the mixing operation can be carried out ought preferably to be at least 0.1 bar (10 000 Pa) above the ambient pressure, more preferably at least 0.2 bar (20 000 Pa), very preferably at least 0.3 bar (30 000 Pa), in particular at least 0.5 bar (50 000 Pa), and especially at least 1 bar (100 000 Pa).

It is normally sufficient to carry out commixing under a superatmospheric pressure of not more than 10 bar ($10^6$ Pa), preferably not more than 8 bar (800 000 Pa), and more preferably not more than 7 bar (700 000 Pa).

Advantages of a process of this kind are, firstly, that under mixing conditions of this kind, as a result of the elevated temperature, the viscosity of the isocyanate component (A) is lowered and it is therefore more readily miscible with the solvent, and, secondly, that under mixing conditions of this kind the elevated pressure hinders evaporation of the solvent.

In one preferred embodiment the isocyanate component (A) with the stated minimum temperature is introduced into the at least one solvent for the purpose of mixing. In this context it may be advantageous for the temperature of said at least one solvent to differ by not more than 40° C., preferably not more than 30° C., more preferably not more than 20° C., and very preferably not more than 10° C. from the temperature of the at least one polyisocyanate. In the case of particularly high-boiling solvent hydrocarbon fractions, however, the temperature difference may even amount to up to 150° C., for example.

In one particularly preferred embodiment the isocyanate component (A) is introduced in the form of a distillation bottom product into said at least one solvent. Since the polyisocyanates are prepared by conventional partial oligomerization from diisocyanates, it is necessary to separate off unreacted diisocyanate from the reaction mixture in order to obtain a monomer content of less than 1% by weight, preferably of less than 0.75%, more preferably of less than 0.5%, and very preferably of less than 0.3% by weight. This generally takes place by distillation in conventional manner, such as by thin-film distillation, at a temperature from 90 to 220° C., advantageously under reduced pressure, and additionally, if appropriate, with an inert stripping gas passed through the system.

Apparatus employed for this purpose includes flash evaporators, falling-film evaporators, thin-film evaporators and/or short-path evaporators, surmounted if appropriate by a short column.

The distillation takes place in general under a pressure of between 0.1 and 300 hPa, preferably below 200 hPa, and more preferably below 100 hPa.

The distillation discharge can then be mixed advantageously directly with said at least one solvent. This has the advantage, moreover, that the hot, concentrated reaction mixture is diluted by its introduction into the solvent and is therefore cooled directly, which makes it possible to reduce follow-on reactions, such as further polymeric molecular enlargement, in the reaction mixture.

For the purpose of generating the mixtures an energy input into the mixing means of generally 0.2 W/kg or more is sufficient, preferably 0.5 or more W/kg, more preferably 1 or more, very preferably 2 or more, in particular 5 or more, and especially 10 W/kg or more. Generally speaking an energy input of more than 30 W/kg affords no advantages. The specific energy input indicated should be interpreted here as the work put in per unit amount of polyisocyanate and solvent in the mixing chamber volume of the mixing means.

Within the process the mixing of the streams takes place in a suitable mixing means distinguished by very complete mixing.

The mixing means used is preferably a mixing circuit, a stirred tank, a static mixer or a pump. Static mixers which can be used include all typical static mixers (e.g., Sulzer SMX/SMV) or else nozzle or baffle mixing means, examples being coaxial mixing nozzles, Y-mixers or T-mixers.

By a mixing circuit is meant in this context a pumped circulation which comprises at least one pump and also, if appropriate, at least one heat exchanger and into which at least one of the components to be mixed, preferably the polyisocyanate, more preferably polyisocyanate and solvent, is/are metered in, preferably upstream of the pump. The pumped circulation may further comprise additional static mixers and/or mixing elements.

When a mixing circuit is used as the mixing means, one component is introduced at high velocity through nozzles. The velocities of the streams immediately prior to mixing are typically between 1 and 100 m/s, preferably between 2 and 80 m/s, more preferably between 5 and 50 m/s.

The mixing time in this mixing means is typically from 0.01 s to 120 s, preferably from 0.05 to 60 s, more preferably from 0.1 to 30 s, very preferably from 0.5 to 15 s, and in particular from 0.7 to 5 s. The mixing time is understood as the time which elapses from the beginning of the mixing operation until 97.5% of the fluid elements of the resulting mixture have a mixing fraction which, based on the theoretical final value of the mixing fraction of the resulting mixture when a state of perfect mixing has been attained, deviates by less than 2.5% from this final mixing fraction value (regarding the concept of the mixing fraction see, for example, J. Warnatz, U. Maas, R. W. Dibble: Verbrennung, Springer Verlag, Berlin Heidelberg New York, 1997, 2nd edition, p. 134).

If mixing is carried out in one or more stirred tanks, such as in 1 to 5, preferably 1-3, more preferably 1-2, and very preferably one stirred tank, or tube reactor, then the average total residence time in all stirred tanks together can be up to 7 hours, preferably up to 1.5 hours. The lower limit for the average total residence time in stirred tanks is taken in general to be 15 minutes, preferably 30 minutes. In tube reactors the residence time may for example be up to 30 minutes, preferably up to 20 minutes, more preferably up to 10 minutes, very preferably up to 5 minutes, and in particular up to 2 minutes. A longer residence time, though possible, does not in general afford any advantages.

The work in the case of stirred tanks may be put in via all possible types of stirrer, such as propeller, inclined-blade, anchor, disk, turbine or bar stirrers. Preference is given to using disk stirrers and turbine stirrers.

In a further possible embodiment, however, the commixing and the energy input in the stirred tank may also take place by means of at least one pumped circulation, which if appropriate may be thermally conditioned by means of at least one heat exchanger mounted in said pumped circulation.

The reactor may be, for example, a reactor with double-wall heating, welded-on tubes or half-tubes, and/or internal heating coils. Also possible is a reactor with an external heat exchanger with natural circulation, in which the circulation flow is brought about without mechanical auxiliary means, or forced circulation (using a pump), forced circulation being particularly preferred.

Suitable circulatory evaporators are known to the skilled worker and are described for example in R. Billet, Verdampfertechnik, HDP-Verlag, Bibliographisches Institut Mannheim, 1965, 53. Examples of circulatory evaporators are tube-bundle heat exchangers, plate-type heat exchangers, etc.

It is of course also possible for there to be two or more heat exchangers present in the circulation.

In a tube reactor it is possible, for the purpose of improved commixing, for perforated plates, slotted plates, packings or static mixers to be installed. The Bodenstein number of a tube reactor of this kind ought for example to be 3 or more, preferably at least 4, more preferably at least 5, very preferably at least 8, and in particular at least 10.

During the commixing operation the mixture may also be further heated, so that the temperature during mixing operation may be increased by up to 5° C., preferably by up to 10° C., more preferably by up to 15° C.

After the mixing operation the mixed discharge can be cooled again to ambient temperature. The discharge can be rationally used to preheat at least one of the streams which is run into the mixing stage, or for the purpose of further heating during the mixing stage.

In any streams in which an isocyanate-containing stream is conveyed, pumps used in the process are preferably forced-delivery pumps, examples being gear pumps, peristaltic pumps, screw pumps, eccentric-screw pumps, spindle pumps or piston pumps, or centrifugal pumps.

Forced-delivery pumps are used in the process preferably for conveying streams which have a viscosity of 250 mPas or more, more preferably 300 mPas or more, very preferably 400 mPas or more, and more particularly 500 mPas or more. Centrifugal pumps are employed preferably for conveying streams having a viscosity of up to 300 mPas, more preferably up to 250 mPas, and very preferably up to 200 mPas. With very particular preference the polyisocyanate-containing stream, following removal of monomeric isocyanate, is conveyed using forced-delivery pumps, and in particular a stream of this kind is metered into the solvent.

Mixing may be practiced continuously, discontinuously or semicontinuously. This means that isocyanate component (A) and solvent are mixed with one another continuously and simultaneously in the desired proportion, or are mixed discontinuously in a separate container, or else one component, preferably the solvent, is introduced first and the other, preferably the polyisocyanate, is metered in. With particular preference the solvent is preheated—to the temperatures indicated above, for example.

The mixtures of polyisocyanates in solvents that are obtainable by the process described are stable on storage.

The obtainable mixtures of isocyanate component (A) in the solvents (B) and also, if appropriate, (C) are generally used in the coatings industry. The mixtures of the invention can be used, for example, in coating materials for 1K [one-component] or 2K [two-component] polyurethane coating materials, such as for primers, surfacers, basecoats, unpigmented topcoat materials, pigmented topcoat materials and clearcoat materials, for example, in the sectors of industrial coating, more particularly aircraft coating or large-vehicle coating, wood coating, automobile coating, more particularly automotive OEM or refinish, or decorative coating. The coating materials are especially suitable for applications requiring particularly high application reliability, outdoor weathering stability, optical qualities, solvent resistance and/or chemical resistance. In accordance with the invention, the curing of these coating materials is not important. More particularly in the automobile industry, multicoat curing regimes are on the increase, such as the curing of clearcoat and basecoat (referred to as two in one), or of surfacer, clearcoat, and basecoat (referred to as three in one).

The mixtures prepared with the process are generally in the form of solutions, but in exceptional cases may also take the form of dispersions.

ppm and percentage figures used in this specification are ppm by weight and percentages by weight, unless specified otherwise.

In this specification, unless noted otherwise, the viscosity is specified at 23° C. in accordance with DIN EN ISO 3219/A.3 in a cone/plate system with a shear rate of 100 $s^{-1}$.

EXAMPLES

The viscosity of an identical IPDI isocyanurate batch having a trimer fraction of 68% by weight and a residual monomer content of 0.5% by weight (values determined in each case by GPC) was dissolved in aromatic hydrocarbon mixtures of different compositions, which had different fractions of alkyl-substituted aromatic compounds containing 10 carbon atoms ("C10 aromatics" for short) between 2% and 25% and which each had a viscosity below 1 mPas. The remainder of the hydrocarbon mixtures was composed essentially of alkyl-substituted aromatic compounds having 9 carbon atoms. The individual constituents of the hydrocarbon mixtures were quantified by gas chromatography (GC) and identified structurally via coupling of GC with mass spectrometry.

| Fraction of C10 aromatics in the solvent [%] | Viscosity of the resultant solution [mPas] |
|---|---|
| 2.7 | 1230 |
| 3.3 | 1360 |
| 6.7 | 1590 |
| 11.1 | 1650 |
| 11.4 | 1670 |
| 11.6 | 1650 |
| 22.6 | 2070 |

The invention claimed is:

1. A mixture comprising
   (A) a polyisocyanate of 1-isocyanato-3-isocyanatomethyl-3,5,5-trimethylcyclohexane (IPDI) in non-blocked form,
   (B) at least one aromatic hydrocarbon mixture composed of more than 50% by weight of alkyl-substituted aromatic compounds having 9 and 10 carbon atoms, and
   (C) optionally, at least one further solvent other than the alkyl-substituted aromatic compounds having 9 and 10 carbon atoms,
   wherein the fraction of alkyl-substituted aromatic compounds having 10 carbon atoms in the aromatic hydrocarbon mixture (B) is 6.7-22.6 wt. %,
   wherein component (A) is present at 63% to 90% by weight of the mixture.

2. The mixture according to claim 1, wherein the total hydrolyzable chlorine content of component (A) in accordance with ASTM specification D4663-98 is less than 200 ppm.

3. The mixture according to claim 1, wherein component (A) is a biuret or isocyanurate of 1-isocyanato-3-isocyanatomethyl-3,5,5-trimethylcyclohexane (IPDI).

4. The mixture according to claim 1, wherein in component (A) in a polyisocyanate the fraction of its parent monomeric diisocyanate is up to 5% by weight.

5. The mixture according to claim 1, wherein component (A) is a polyisocyanate which contains isocyanurate groups and has a trimer content of 40% to 80% by weight.

6. The mixture according to claim 1, wherein component (A) is a polyisocyanate which contains isocyanurate groups and which has an NCO content to DIN EN ISO 11909 of 16.7%-17.6%, a melting range of 100 to 130° C., and an average NCO functionality of 3.0 to 4.0.

7. The mixture according to claim 1, wherein component (A) in solvent-free form has a viscosity at 23° C. of at least 8000 mPas and/or a functionality of at least 4.

8. The mixture according to claim 1, wherein the fraction of aliphatics and/or cycloaliphatics in component (B) is less than 30% by weight.

9. The mixture according to claim 1, wherein the fraction of naphthalenes and polycyclic aromatics in component (B) is less than 5% by weight.

10. The mixture according to claim 1, wherein the fraction of aromatics having up to 8 carbon atoms in component (B) is less than 5% by weight.

11. The mixture according to claim 1, wherein the boiling range of the hydrocarbon mixtures (B) comprises the temperature range from approximately 150° C. to 190° C.

12. The mixture according to claim 1, wherein component (C) is present and is selected from the group consisting of halogenated hydrocarbons, ketones, esters, and ethers.

13. The mixture according to claim 1, wherein component (C) is present and is selected from the group consisting of n-butyl acetate and 1-methoxyprop-2-yl acetate.

14. The mixture according to claim 1, wherein components (B) and (C) are present in a volume ratio of 5:1 to 1:5.

15. A process for preparing a mixture according to claim 1, which comprises mixing isocyanate component (A) and solvent (B) and optionally, (C) with one another at a temperature of at least 40° C. and a pressure above atmospheric pressure.

16. A coating composition for one-component or two-component polyurethane coating materials, for primers, surfacers, basecoats, unpigmented topcoats, pigmented topcoats, and clearcoats in the sector of industrial coating, aircraft coating or large-vehicle coating, wood coating, automotive finishing, OEM coating or automotive refinish, or decorative coating, comprising a mixture according to claim 1.

17. The mixture according to claim 1, wherein the mixture has a viscosity of 1,590-2,070 mPa·s at 23° C.

18. The mixture according to claim 1, wherein component (A) is present in an amount of 80-90 wt. %, based on a total weight of component (A) and (B).

19. A mixture comprising
   (A) from 63% to 90% by weight of a polyisocyanate of 1-isocyanato-3-isocyanatomethyl-3,5,5-trimethylcyclohexane (IPDI) in non-blocked form, based on the weight of the mixture;
   (B) at least one aromatic hydrocarbon mixture composed of more than 90% by weight of alkyl-substituted aromatic compounds having 9 and 10 carbon atoms; and
   (C) optionally, at least one further solvent other than the alkyl-substituted aromatic compounds having 9 and 10 carbon atoms,
   wherein the fraction of alkyl-substituted aromatic compounds having 10 carbon atoms in the aromatic hydrocarbon mixture (B) is not more than 3.3 wt. %.

20. The mixture according to claim 18, wherein the (B) at least one aromatic hydrocarbon mixture is composed of more than 95% by weight of alkyl-substituted aromatic compounds having 9 and 10 carbon atoms.

* * * * *